United States Patent [19]

LaBar

[11] 4,158,568
[45] * Jun. 19, 1979

[54] CORROSION RESISTANT REFRACTORY MIX

[75] Inventor: Richard G. LaBar, Export, Pa.

[73] Assignee: Aluminum Company of America, Pittsburgh, Pa.

[*] Notice: The portion of the term of this patent subsequent to May 9, 1995, has been disclaimed.

[21] Appl. No.: 903,786

[22] Filed: May 8, 1978

Related U.S. Application Data

[63] Continuation-in-part of Ser. No. 759,984, Jan. 17, 1977, Pat. No. 4,088,502, which is a continuation-in-part of Ser. No. 639,993, Dec. 12, 1975, abandoned.

[51] Int. Cl.$^2$ .......................... C04B 35/02; C04B 7/32
[52] U.S. Cl. .......................................... 106/64; 106/55; 106/104
[58] Field of Search .................. 106/64, 63, 55, 104

[56] References Cited

U.S. PATENT DOCUMENTS

| | | | |
|---|---|---|---|
| 2,516,892 | 8/1950 | Lobaugh | 106/64 |
| 2,874,071 | 2/1959 | Kadisch et al. | 106/64 X |
| 2,997,402 | 8/1961 | McDonald et al. | 106/63 |
| 3,253,936 | 5/1966 | Wandel | 106/64 |
| 3,471,306 | 10/1969 | Rubin | 106/63 |
| 4,088,502 | 5/1978 | LaBar | 106/64 |

*Primary Examiner*—Delbert E. Gantz
*Assistant Examiner*—William G. Wright
*Attorney, Agent, or Firm*—John P. Taylor

[57] ABSTRACT

A corrosion resistant refractory mortar or castable mix is provided comprising a particulate mixture capable of mixture with water to form a castable refractory or mortar having enhanced corrosion resistance to molten aluminum which is particularly useful in the production of ultra high purity aluminum. The mixture consists essentially of 10 to 34 parts by weight calcium aluminate, 1.5 to 10 parts by weight of a zinc borosilicate frit and 60 to 88 parts by weight alumina. The zinc borosilicate frit consists essentially of 50 to 60% by weight zinc oxide, 20 to 40% by weight boron oxide, 8 to 12% by weight silicon oxide and 0 to 10% by weight aluminum oxide with less than 0.5% by weight of other impurities. The refractory mix contains not greater than 1% by weight impurities.

4 Claims, 1 Drawing Figure

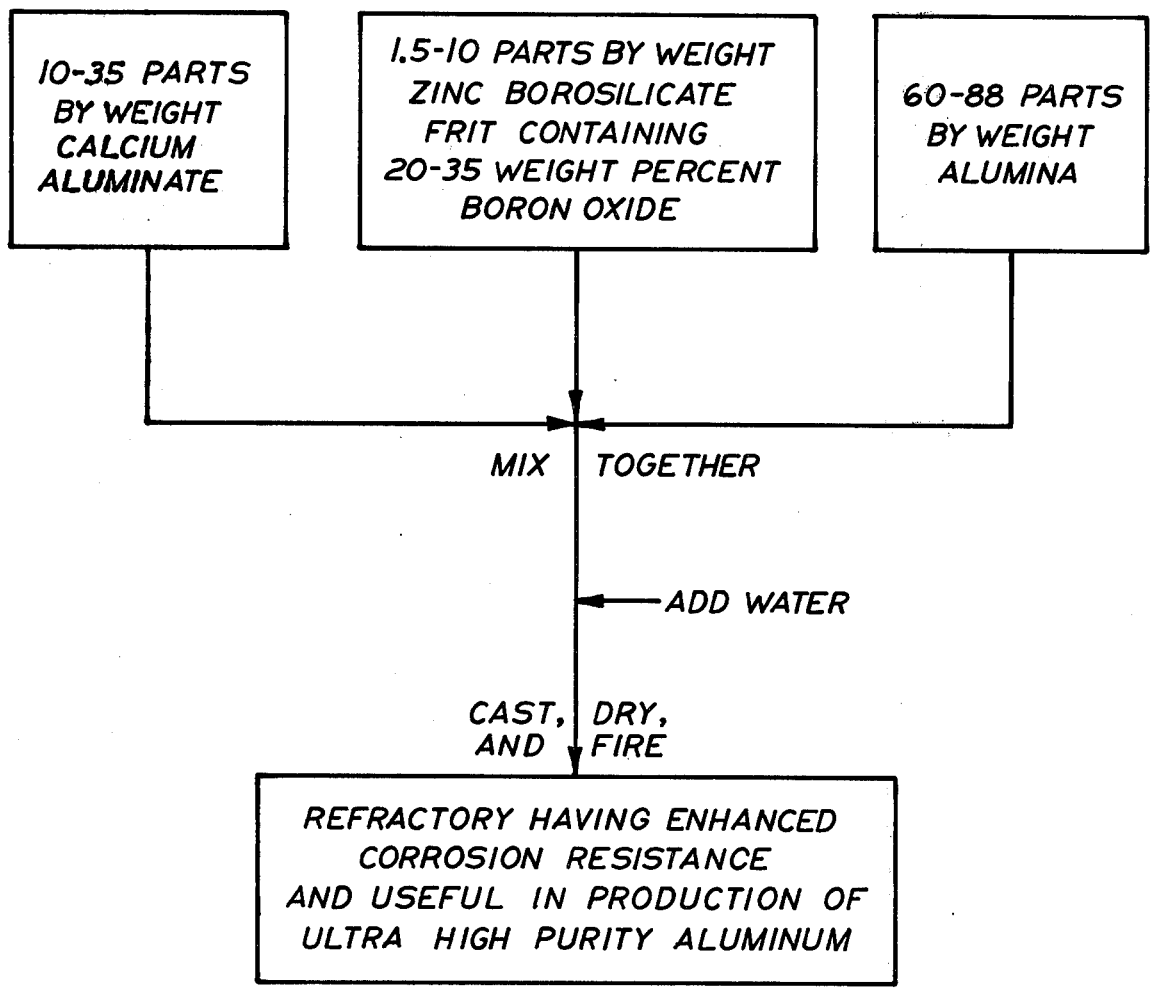

CORROSION RESISTANT REFRACTORY MIX

CROSS REFERENCE TO RELATED APPLICATIONS

This application is a continuation-in-part of U.S. patent application Ser. No. 759,984, filed Jan. 17, 1977 now U.S. Pat. No. 4,088,502 dated May 9, 1978, as a continuation-in-part of U.S. patent application Ser. No. 639,993, filed Dec. 12, 1975, now abandoned.

BACKGROUND OF THE INVENTION

This invention relates to refractory mixtures. More particularly, it relates to a refractory mixture capable for use as a mortar or for castable refractories and having enhanced corrosion resistance to molten aluminum.

In the processing of metal such as aluminum and aluminum alloys for casting or purification, the metal is generally melted in a furnace and conveyed in troughs lined with suitable refractory material to inhibit attack by the molten aluminum. Calcium aluminate is known as a good refractory material from the standpoint of corrosion resistance to molten aluminum. However, as discussed in my parent applications, calcium aluminate has a high thermal conductivity and a high thermal expansion coefficient. Therefore, the use of calcium aluminate with fused silica is sometimes preferred to overcome such difficulties.

My parent applications discussed the problems of metal attack by molten aluminum on silica-based refractories and the prior art attempts to overcome these problems using boron oxide additives. It was pointed out that the prior art incorporated the boron oxide into the mixture by providing a fused or glassy matrix of calcium oxide, boron oxide and aluminum oxide. For example, McDonald et al U.S. Pat. No. 2,997,402 teaches a refractory which comprises a homogeneous vitreous product and a refractory aggregate wherein the homogeneous vitreous product is a fused mixture of calcium oxide, boron oxide and aluminum oxide and the refractory aggregate is principally a mixture of aluminum oxide and silicon dioxide in comminuted form. McDonald et al also suggest that up to 15% by weight of an additional metal oxide component can also be incorporated in the glass such as the oxides of magnesium, barium, beryllium, zirconium, zinc, vanadium, silicon, chromium and molybdenum.

Rubin et al U.S. Pat. No. 3,471,306 mixes bond-forming components containing $Al_2O_3$, $B_2O_3$, and CaO with a pre-calcined granular grog containing $SiO_2$ in excess of $Al_2O_3$ to form a calcium boroaluminate bond in situ.

While the use of such materials can result in satisfactory mixtures, fritted or glass matrices comprising calcium oxide, boron oxide and aluminum oxide are not easily formed. For example, in the formation of the homogeneous vitreous product of McDonald et al care must be taken to minimize the water solubility of the frit wherein the boron oxide and the calcium oxide might otherwise be leached out. On the other hand, the formation of a calcium boroaluminate bond in situ as in Rubin et al is not easily achieved because of added complications in firing due to the presence of the aggregate (e.g. one cannot melt the bond-forming components as in McDonald et al to ensure formation of a homogeneous stable mixture).

It is therefore an object of the invention claimed in my parent application and in this application to provide a refractory mixture wherein a boron oxide-containing material is used in the form of a zinc borosilicate glass frit having a low content (less than 0.5% by weight) of impurities such as alkali and alkaline earth additives which could otherwise be leached out of the frit in aqueous systems commonly used to form refractories.

SUMMARY OF THE INVENTION

In accordance with the present invention, a particulate mixture capable of mixture with water to form a castable refractory having enhanced corrosion resistance to molten aluminum is provided consisting essentially of 90 to 98.5% by weight refractory material and 1.5 to 10% by weight zinc borosilicate frit consisting essentially of 50 to 60% by weight zinc oxide, 20 to 40% by weight boron oxide, 8 to 12% by weight silicon oxide and 0 to 10% by weight aluminum oxide with less than 0.5% by weight impurities and wherein the total amount of impurities within the refractory material is not greater than 1% by weight. In a preferred embodiment, the refractory mixture consists essentially of 10 to 35 parts by weight calcium aluminate, 60 to 88 parts by weight alumina and 1.5 to 10 parts by weight of a zinc borosilicate frit consisting essentially of 50 to 60% by weight zinc oxide, 30 to 38% by weight boron oxide and 8 to 12% by weight silicon oxide with less than 0.5% by weight impurities in the frit and wherein the refractory mixture has a total impurity content of 1% by weight.

While the use of calcium aluminate cement and tabular alumina is known to provide a refractory having good corrosion resistance even without additives, it has been unexpectedly found that the use of as little as 1.5 parts by weight of the above zinc borosilicate frit can measurably enhance the corrosion resistance of a calcium aluminate-tabular alumina refractory mix to an extent which makes possible its use in a furnace making ultra high purity (99.993% by weight) aluminum.

BRIEF DESCRIPTION OF THE DRAWING

The sole FIGURE is a flowsheet illustrating the invention.

DESCRIPTION OF THE INVENTION

In accordance with the invention, the corrosion resistant castable refractory mix consists essentially of three principal ingredients: calcium aluminate, alumina and zinc borosilicate with a total impurities content of not greater than 1% by weight.

In a particularly preferred embodiment of the invention, the calcium aluminate comprises a mixture of 75 to 83% by weight $Al_2O_3$ and 14 to 23% by weight CaO with a total of not more than 3% by weight of other oxides, primarily ZnO, $B_2O_3$ and $SiO_2$, and some ignition loss. An example of such a calcium aluminate is the calcium aluminate cement sold by Aluminum Company of America under the designation CA-25. The calcium aluminate is used in particulate form in a particle size range of about 90% by weight $-325$ mesh (U.S. Standard Sieve Series). The amount of calcium aluminate used in the mixture of the invention should be about 10 to 35% by weight and preferably 20 to 35 parts by weight of the total weight of the three ingredients.

The alumina such as tabular alumina is used in a particle size range of about $-4$ mesh (U.S. Standard). Preferably, the alumina particle mixture contains about 50% by weight particles of $-10$ to $+325$ mesh with the balance smaller. Most preferably, about 20 to 30% by weight of the particles are $-10$ to $+20$ mesh, about 15 to 25% by weight −20 to +100 mesh and the balance −100 mesh. The total amount of particulate tabular alumina used should be approximately 60 to 88 parts by weight of the total weight of the three components of the mixture.

The borosilicate glass frit used in the invention consists essentially of a fused mixture of zinc oxide (ZnO), boron oxide ($B_2O_3$) and silicon dioxide ($SiO_2$). The amount of boron oxide in the frit should be 20 to 40% by weight and preferably 30 to 38% by weight. The amount of zinc oxide in the frit should be 50 to 60% by weight. The amount of silicon oxide in the frit should be 8 to 12% by weight. Aluminum oxide may be added as an optional ingredient up to 10% by weight. The total amount of other impurities such as alkali metal oxides, calcium oxide, or the like should be less than 0.5% by weight to ensure a water solubility of the frit of less than 1% by weight and preferably 0.4 to 0.6% by weight to prevent adversely affecting rheological and hydraulic properties of the castable refractory. In combination with the alumina and calcium aluminate cement, the frit forms a visco-elastic bond, at aluminum processing temperatures (600° to 900° C.), in the refractory castable or mortar and between the latter and surrounding refractories as in brick-mortar joint construction, the result of which is a strong, non-wetting bond. As is well known to those skilled in the art, the mixtures of oxides should be heated to a temperature sufficient to fuse them into a homogeneous glass mixture which is subsequently quenched to prevent crystallization (fritted) which would otherwise permit solubilizing of any of the ingredients therein in a subsequently formed hydraulic setting castable refractory. In accordance with the invention, the zinc borosilicate glass should be ground to a particle size range of at least −100 mesh and preferably −200 mesh (U.S. Standard). The borosilicate frit content of the castable refractory mix should be about 1.5 to 10 parts by weight.

As is well known to those skilled in the art, boric acid may optionally be added to the refractory mix in an amount of about 0.1 to 1% by weight as a retarder to extend the pot life when the mix is used as a mortar.

To further illustrate the invention, a Hoopes cell for the production of ultra high purity aluminum (99.993% by weight) was lined with high purity alumina bricks bonded with a mortar prepared in accordance with the invention consisting of 33% by weight calcium aluminate cement (Alcoa CA-25); 64.5% by weight of 99% by weight purity tabular alumina (−48 mesh-Tyler); 2% by weight zinc borosilicate frit; and 0.5% by weight $H_3BO_3$ as a retarder. After operation of the cell, analysis of the aluminum from the high purity cathode layer indicated a purity of 99.993% by weight. The impurities comprised 20 ppm Si, 15 ppm Fe, 25 ppm Cu and 11 ppm other metals.

Thus, the invention provides a refractory mix wherein the corrosion resistance of a calcium aluminate-alumina mixture is further enhanced by the use of a zinc borosilicate frit permitting use of the mix in a refractory lining in applications where the production of ultra high purity aluminum cannot tolerate even minor amounts of corrosion by molten aluminum.

Having thus described the invention, what is claimed is:

1. A particulate refractory mixture capable of mixture with water to form a refractory having enhanced corrosion resistance for usage in the production of ultra high purity aluminum consisting essentially of: 90 to 98.5% by weight refractory material and 1.5 to 10% by weight of a zinc borosilicate frit consisting essentially of 50 to 60% by weight zinc oxide, 20 to 40% by weight boron oxide, 8 to 12% by weight silicon oxide and 0 to 10% by weight aluminum oxide with less than 0.5% by weight impurities in the frit and not more than 1% by weight impurities in the refractory mixture.

2. The mixture of claim 1 wherein said zinc borosilicate frit has a particle size of not greater than −100 mesh.

3. The refractory mixture of claim 1 wherein said refractory material consists essentially of 10 to 35% by total weight calcium aluminate and 60 to 88% by weight alumina and the zinc borosilicate frit contains 50 to 60% by weight zinc oxide, 30 to 38% by weight boron oxide and 8 to 12% by weight silicon oxide.

4. A corrosion resistant castable refractory mix capable of mixture with water to form a castable refractory having enhanced corrosion resistance to molten aluminum consisting essentially of 10 to 35% by weight calcium aluminate, 1.5 to 10% by weight of a zinc borosilicate frit consisting essentially of zinc oxide, boron oxide and silicon oxide with less than 0.5% by weight impurities and 60 to 88% by weight alumina.

* * * * *